D. K. WILSON.
MECHANICAL MOVEMENT.
APPLICATION FILED APR. 27, 1908.
925,547.
Patented June 22, 1909.
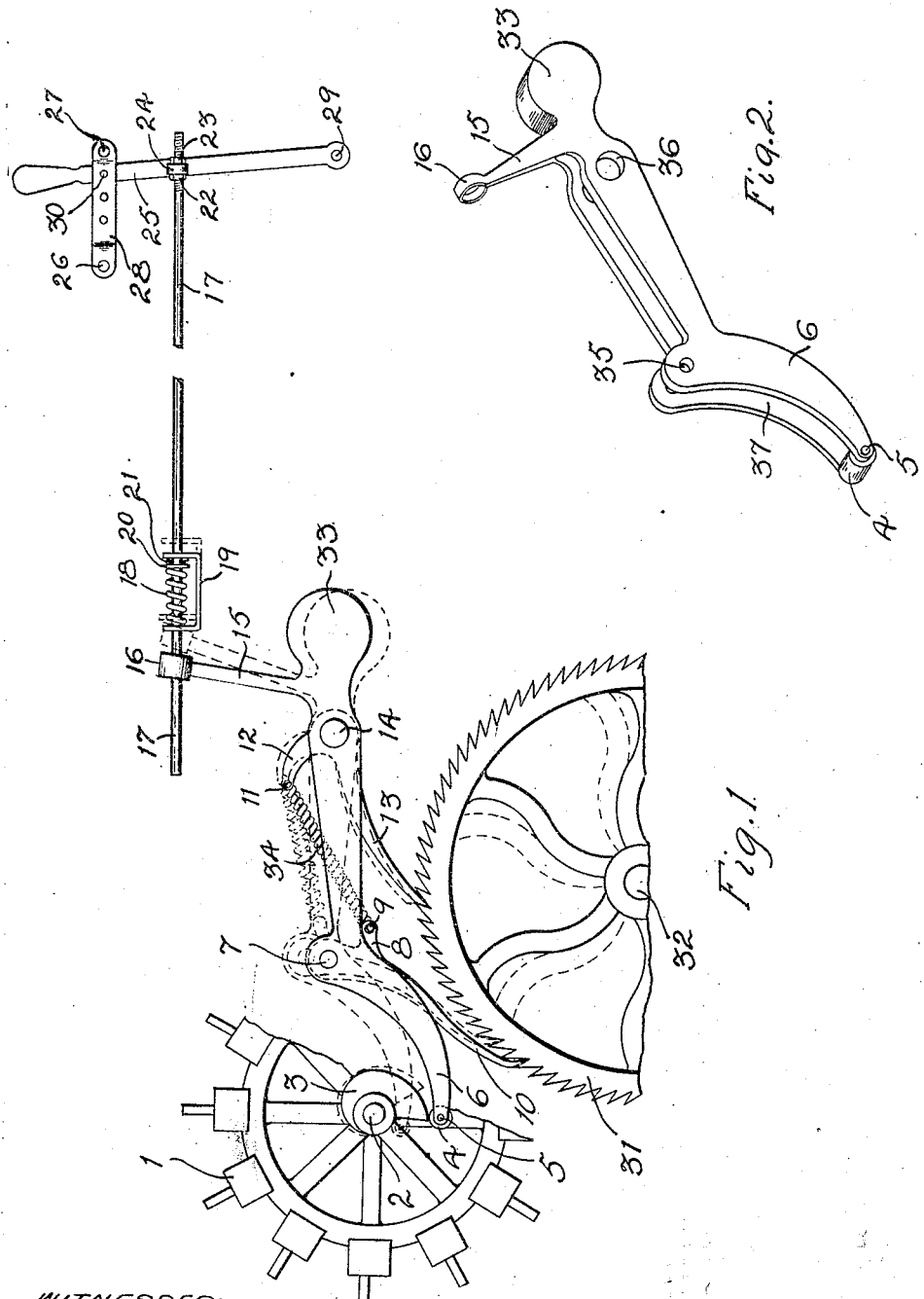
WITNESSES:
H. B. Burr.
Ila Haydank
INVENTOR
Dalton K. Wilson.
BY
G. C. Kennedy,
ATTORNEY.

UNITED STATES PATENT OFFICE.

DALTON K. WILSON, OF WATERLOO, IOWA, ASSIGNOR TO WILLIAM GALLOWAY COMPANY, OF WATERLOO, IOWA.

MECHANICAL MOVEMENT.

No. 925,547.  Specification of Letters Patent.  Patented June 22, 1909.

Application filed April 27, 1908. Serial No. 429,360.

*To all whom it may concern:*

Be it known that I, DALTON K. WILSON, a citizen of the United States of America, and a resident of Waterloo, Blackhawk county, Iowa, have invented certain new and useful Improvements in Mechanical Movements, of which the following is a specification.

My invention relates to improvements in mechanical movements, and the object of my improvement is to furnish, in that class of manure spreaders which have a movable conveyer-apron driven by a pawl-and-ratchet mechanism actuated by the rotatable shaft of the beater-drum, a resilient connection intermediate between the said pawl-and-ratchet device and an adjusting-lever pivotally connected to the spreader-box. This object I have attained by the means which are hereinafter described and claimed, and which is illustrated in the accompanying drawings, in which:

Figure 1 is a side elevation of such a pawl-and-ratchet driving mechanism with its actuating means, and adjusting-lever, and with my resilient connection located operatively between said lever and said pawl-and-ratchet-driving means. Fig. 2 is a perspective of the bifurcated bell-crank lever actuated by said means.

Similar numbers refer to similar parts throughout the several views.

The pawl-and-ratchet driving mechanism and its adjusting means is shown as dissociated from the wagon-box and movable conveyer-apron of a manure-spreader. The rotatable shaft 2 may be located at one end of a wagon-box containing a movable conveyer-apron, the latter driven by sprocket-wheels and chains connected to the apron-shaft 32. The adjusting-lever 25 may be pivoted at the orifice 29 in its lower end to the forward part of the wagon-box on the same side as the mechanism shown.

The numeral 31 designates a ratchet-wheel secured to the end of the shaft 32 on the same side of the spreader as said lever, and a beater-drum 1 is also secured on the other transverse shaft 2, with a cam-wheel 3 secured on the latter shaft on the same side as the said ratchet-wheel.

A bell-crank lever having substantially horizontal and vertical members is pivoted at their angle of junction on a stud 14 projecting from the spreader-box into its bearing-orifice 36. As shown in Fig. 2, this lever has a forwardly-projecting weight 33 adapted to balance the heavy horizontal member, which thus prevents excessive vibration of the latter when the machine is jolting over rough roads or lumpy fields. The horizontal member of the bell-crank lever is bifurcated into two parallel parts 6 and 37, spaced apart, and orificed at their ends and in a medial location at 35 to provide bearings, first, for the pintles 5 of an anti-friction roller 4, and second, for the pintles 7 of a driving-pawl 10. The space between the parts 6 and 37 extends forward beyond the stud 14, and the pawl 13 is pivoted on said stud within said space. This bell-crank lever is so suspended that its anti-friction roller 4 is properly located to be operatively contacted and the lever itself oscillated by the cam-wheel 3, while the pawls 10 and 13 carried by said lever are adapted to operatively engage the teeth of the ratchet-wheel 31. The pawl 10 acts as a driving-pawl, and the pawl 13 as a holding-pawl. In order to keep the said pawls down so that they may not lift up away from the teeth of said ratchet-wheel but be compelled to click back thereover so as to be at all times ready for service, I have contrived resilient means for effecting that purpose. This consists of a tension-spring 34 connected between an orifice 9 in a lug 8 on the pawl 10 below the latter's pivot, and the orifice 11 in another lug or arm 12 extending as an independent member of a bell-crank lever from the pawl 13 above the latter's pivot 14. The tension thereby produced will draw upon both pawls so as to keep their ends down in contact with said ratchet-wheel.

The vertical member 15 of the bell-crank lever has an orificed bearing 16 at its upper end adapted to receive slidably therethrough the rear end of the connecting-rod 17, the forward end of said connecting-rod being threaded so as to be adjustably secured by the nuts 22 and 23 to a swivel-connection 24 on the hand-lever 25. The hand-lever 25 has a stud which can be sprung into any one of the orifices 30 in the rack-bar 28, the latter being secured to the spreader-box by fastening-means passed through the orifices 26 and 27. In order to limit the play of the orificed member 15 upon the rod 17, I have adopted the following-described resilient connecting-means.

The numeral 19 designates a slide-piece having upwardly-projecting orificed members spaced apart and adapted to slide upon the rod 17. Between such members, just anterior to the orificed member 15, a split-key 21 is inserted in a hole extending through said rod 17, and between said split-key and the rearmost member of 19 a washer 20 and a spiral spring 18 is mounted about said rod, so that said spring 18 may be compressed between the split-key and washer on one side and the said rearmost member on the other, when the member 15 presses forward against such slide-piece, or when the adjusting-lever 25 is used to thrust back the rod 17 to cause the slide-piece to push upon the member 15. When the adjusting-lever 25 is in the position shown in Fig. 1, the members of the bell-crank lever are actuated by the cam-wheel 3 to the fullest extent, as indicated by the dotted lines. Since the rod 17 is fixed, the spring 18 is somewhat compressed at each forward movement of the member 15, and the spring acts as a cushion alleviating the jarring of the parts. When the adjusting-lever 25 is thrown back to a greater extent, the resilient slide-piece 19 pushes back the member 15, thus limiting its play, as well as the play of the forks 6 and 37, and the stroke of the driving-pawl 10 is correspondingly decreased in extent, which slows up the motion of the shaft 32 and its connected conveyer-apron. The interposed spring 18, however, when an adjustment of the rod 17 is made, by its resiliency prevents a sudden jar upon the moving parts of the pawl-and-ratchet device, and thus obviates breakage, and renders the change of adjustment smooth and gradual while the change of speed is being effected through the medium of the ratchet-wheel 31.

It will be observed that the spring 34 which is connected between the pawls 10 and 13 is sloped in position to the rear. This degree of slope is fixed in such an amount, that the pull of the spring upon the pawl 10 is efficient in two ways. The tension effected not only causes the pawl 10 to be held down sufficiently so as not to lift entirely away from the teeth of the ratchet-wheel 31, but on account of the location of such pawl overhanging the rear side of the wheel, the spring also has enough upward pull upon the pawl to cause it to lift and quickly move out and away from the roots of the teeth as it starts up with the upwardly moving lever arms 6 and 37. The spring 34 furthermore has another use, which is, to aid in lifting the members 6 and 37 to keep them in a position where the roller 4 will at all times be in operative contact with the working edge of the cam-wheel 3 according to adjustment. This is due to the pull of said spring from its point of connection 11 at such an angle as will tend to lift upon said members. The relative location and direction of the spring 34 is therefore useful and effective as shown in the mechanism.

Having described my invention, what I claim as new, and desire to secure by Letters Patent, is:

1. In combination, a ratchet-wheel secured to a rotatable shaft, a swinging-lever, means for oscillating said swinging-lever, a driving-pawl adapted to engage the teeth of said ratchet-wheel and be actuated by said swinging-lever, a holding-pawl, and a resilient connection between said driving-and holding-pawls adapted to keep them in contact with said ratchet-wheel to click back thereover when said swinging-lever is reciprocated, and resilient adjusting-means for varying the scope of movement of said swinging-lever as desired.

2. In combination, a ratchet-wheel secured to a rotatable shaft, a swinging-lever, means for oscillating said swinging-lever, a driving-pawl adapted to operatively engage the teeth of said ratchet-wheel and pivoted to and actuated by said swinging-lever, a hand-lever provided with means for adjustment, a connecting-rod having a pivotal connection with said hand-lever and a slidable connection with said swinging-lever, a lug on said connecting-rod, a sliding-frame on said rod inclosing said lug, a resilient body engaged between said lug and sliding-frame, said sliding-frame adapted to contact with said swinging-lever at the point of its slidable connection with said rod to permit the hand-lever to resiliently adjust the scope of movement of said swinging-lever.

3. In combination, a ratchet-wheel, a swinging-lever, means for oscillating said swinging-lever, a driving-pawl and a holding-pawl, the driving-pawl pivotally secured to said swinging-lever, and both pawls adapted to engage the teeth of said ratchet-wheel, resilient means so connected between said pawls as to cause them to click back over the teeth of said ratchet-wheel, and to lift the driving-pawl from between such teeth when said lever is moving in one direction.

4. In combination, a ratchet-wheel, a swinging-lever, actuating means for oscillating said lever, a driving-pawl pivotally connected to said lever and adapted to engage the teeth of said ratchet-wheel, resilient means for keeping said lever in operative engagement with its said actuating means, said resilient means also being adapted to cause said driving-pawl to lift from between the teeth of said ratchet-wheel and click back thereon when said lever is moving in one direction.

Signed at Waterloo, Iowa, this 9th day of April, 1908.

DALTON K. WILSON

Witnesses:
O. D. YOUNG,
G. C. KENNEDY.